US012242990B1

United States Patent
Kuhn et al.

(10) Patent No.: US 12,242,990 B1
(45) Date of Patent: Mar. 4, 2025

(54) APPARATUS AND METHOD FOR INTEGRATING CONSTRUCTION PROJECT SPECIFICATIONS AND RELATED SUBMITTAL DOCUMENTATION

(71) Applicant: Buildsite LLC, Oakland, CA (US)

(72) Inventors: Paul R. Kuhn, El Cerrito, CA (US); Ivan V. Kurmanov, Minsk (BY); Daniel A. Navarro, Oakland, CA (US); Edmond F. Trainor, Piedmont, CA (US)

(73) Assignee: Buildsite LLC

( * ) Notice: Subject to any disclaimer, the term of this patent is extended or adjusted under 35 U.S.C. 154(b) by 57 days.

(21) Appl. No.: 17/475,924

(22) Filed: Sep. 15, 2021

Related U.S. Application Data

(63) Continuation of application No. 15/789,848, filed on Oct. 20, 2017, now Pat. No. 11,138,534.

(60) Provisional application No. 62/410,779, filed on Oct. 20, 2016.

(51) Int. Cl.
*G06Q 10/0631* (2023.01)

(52) U.S. Cl.
CPC .. *G06Q 10/06313* (2013.01); *G06Q 10/06315* (2013.01)

(58) Field of Classification Search
None
See application file for complete search history.

(56) References Cited

U.S. PATENT DOCUMENTS

| 5,189,606 A | 2/1993 | Burns |
| 5,341,469 A * | 8/1994 | Rossberg ............ G06Q 10/06 715/205 |
| 6,038,547 A | 3/2000 | Casto |
| 6,976,213 B1 * | 12/2005 | Letourneau ............ G06F 30/00 707/999.006 |
| 7,089,203 B1 | 8/2006 | Crookshanks |

(Continued)

OTHER PUBLICATIONS

Björk, Bo-Christer, Pekka Huovila, and Sven Hult. "Integrated construction project document management (ICPDM)." Proceedings of EuropIA. vol. 93. 1993 (Year: 1993).*

(Continued)

*Primary Examiner* — Darlene Garcia-Guerra
(74) *Attorney, Agent, or Firm* — Fitch, Even, Tabin & Flannery LLP

(57) ABSTRACT

A machine has a network interface circuit for communication with a network. A processor is connected to the network interface circuit. A memory is connected to the processor and the network interface circuit. The memory stores data and instructions executed by the processor to receive a specification book detailing a construction project. Extracted text from the specification book is associated with specification book hyperlinks. Submittal log packages comprising subsets of the specification book hyperlinks are defined. Each submittal log package is associated with a subset of the construction project. The submittal requests are distributed based upon the submittal log packages. Approvals for acts performed corresponding to the submittal requests are collected. The specification book is augmented with the approvals and iterative feedback to characterize evolution of the construction project and construction project documentation.

20 Claims, 15 Drawing Sheets

(56) References Cited

U.S. PATENT DOCUMENTS

| | | | |
|---|---|---|---|
| 7,107,268 B1* | 9/2006 | Zawadzki | G06Q 10/06 707/999.009 |
| 7,991,680 B2 | 8/2011 | Livesay | |
| 7,996,441 B2 | 8/2011 | Johnson | |
| 8,041,650 B2 | 10/2011 | Gaffey | |
| 9,146,913 B2* | 9/2015 | Gorbaty | G06Q 10/06 |
| 9,684,643 B2* | 6/2017 | Chegini | G06Q 50/08 |
| 11,138,534 B1 | 10/2021 | Kuhn | |
| 2002/0029231 A1 | 3/2002 | Aptus | |
| 2003/0101085 A1 | 5/2003 | Butler | |
| 2005/0108232 A1 | 5/2005 | Rockey | |
| 2006/0069986 A1* | 3/2006 | Sandoval | G06Q 10/06 715/251 |
| 2006/0185275 A1* | 8/2006 | Yatt | G06F 30/13 52/236.1 |
| 2006/0294235 A1 | 12/2006 | Joseph | |
| 2007/0016514 A1* | 1/2007 | Al-Abdulqader | G06Q 10/06311 705/37 |
| 2007/0112788 A1 | 5/2007 | Kobza | |
| 2007/0112860 A1* | 5/2007 | Ostanik | G06Q 10/107 |
| 2007/0288364 A1 | 12/2007 | Gendler | |
| 2008/0301142 A1 | 12/2008 | Marolf | |
| 2009/0018889 A1 | 1/2009 | Petersen | |
| 2010/0268705 A1 | 10/2010 | Douglas | |
| 2011/0213631 A1 | 9/2011 | Mislavsky | |
| 2012/0110087 A1 | 5/2012 | Culver | |
| 2012/0265707 A1* | 10/2012 | Bushnell | G06Q 50/08 705/342 |
| 2012/0284596 A1* | 11/2012 | Bushnell | G06Q 10/06 715/205 |
| 2013/0205224 A1* | 8/2013 | Grundvig | G06Q 10/06 715/751 |
| 2013/0346506 A1* | 12/2013 | Zimmerman | G06Q 10/06 709/205 |
| 2014/0129366 A1 | 5/2014 | Mudhar | |
| 2014/0278705 A1 | 9/2014 | Tuggle | |
| 2015/0032489 A1* | 1/2015 | Yanchenko | G06Q 10/06311 705/7.13 |
| 2017/0242863 A1* | 8/2017 | Dorairajan | G06F 16/116 |

OTHER PUBLICATIONS

C. Hayes, Jane Huffman, Alex Dekhtyar, and Senthil Karthikeyan Sundaram. "Advancing candidate link generation for requirements tracing: The study of methods." IEEE Transactions on Software Engineering 32.1 (2006): 4-19 (Year: 2006).*

Opitz, Frank, Ronny Windisch, and Raimar J. Scherer. "Integration of document- and model-based building information for project management support." Procedia Engineering 85 (2014): 403-411 (Year: 2014).*

Cheung, Sai On, Henry CH Suen, and Kevin KW Cheung. "PPMS: a web-based construction project performance monitoring system." Automation in construction 13.3 (2004): 361-376 (Year: 2004).*

Ghanem, Amine; "Real-Time Construction Project Progress Tracking: A Hybrid Model for Wireless Technologies Selection, Assessment, and Implementation"; The Florida State University College of Engineering; 2007.

Kuhn; U.S. Appl. No. 15/789,848, filed Oct. 20, 2017.

USPTO; Examiner Interview Summary issued in U.S. Appl. No. 15/789,848 mailed Dec. 1, 2020.

USPTO; Final Office Action issued in U.S. Appl. No. 15/789,848 mailed Nov. 19, 2019.

USPTO; Non-Final Office Action issued in U.S. Appl. No. 15/789,848 mailed Jun. 21, 2019.

USPTO; Non-Final Office Action issued in U.S. Appl. No. 15/789,848 mailed Oct. 7, 2020.

USPTO; Notice of Allowance issued in U.S. Appl. No. 15/789,848 mailed Jun. 7, 2021.

* cited by examiner

PART 2 - PRODUCTS 2.1   MATERIALS, GENERAL

A.   Recycled Content:
       1.   Unless otherwise indicated in articles below, provide glass, and slag-wool-fiber/rock-wool-fiber insulation with recycled content so postconsumer recycled content plus one-half of preconsumer recycled content is not less than 25 percent.
       2.   Unless otherwise indicated in articles below, provide polystyrene insulation with recycled content so postconsumer recycled content plus one-half of preconsumer recycled content is not less than 10 percent.

B.   Formaldehyde Free: Provide formaldehyde-free products, or low emitting products when tested according to ASTM D 5116 and shown to emit less than 0.05-ppm formaldehyde.

2.2   FOAM-PLASTIC BOARD INSULATION
       702
   A.   Extruded-Polystyrene Board Insulation: Rigid, closed-cell extruded expanded polystyrene with integral high density skin complying with ASTM C 578, of type and minimum compressive strength indicated below, with R-values of 5 per inch at 75 deg. F.; maximum flame-spread and smoke-developed indexes of 75 and 450, respectively, per ASTM E 84.
       1.   Insulation : Type VII, 1.80 lb/cu. ft., and 60 psi (414 kPa); manufacturer's standard sizes; thickness as shown; with channeled edges; one of the following:
           a.   "Styrofoam PlazaMate" (The Dow Chemical Co.).
           b.   "Foamular 604" (Owens-Corning Corp.).
           c.   "CertiFoam Plaza Deck" (DiversiFoam Products).
           d.   "GreenGuard CM Insulation Board" (Pactiv Building Products).

B.   Unfaced Wall Insulation Drainage Panels: Extruded-polystyrene board insulation complying with ASTM C 578, Type IV, 25-psi (173-kPa) minimum compressive strength; unfaced; fabricated with shiplap or channel edges and with one side having grooved drainage channels.
       1.   Manufacturers: Subject to compliance with requirements, provide products by one of the following:
           a.   DiversiFoam Products.
           b.   Dow Chemical Company (The).
           c.   Pactiv Building Products.

THERMAL INSULATION                                                            072100 - 3

APPARATUS AND METHOD FOR INTEGRATING CONSTRUCTION PROJECT SPECIFICATIONS AND RELATED SUBMITTAL DOCUMENTATION

CROSS-REFERENCE TO RELATED APPLICATIONS

This application is a continuation of U.S. application Ser. No. 15/789,848, filed Oct. 20, 2017, for APPARATUS AND METHOD FOR INTEGRATING CONSTRUCTION PROJECT SPECIFICATIONS AND RELATED SUBMITTAL DOCUMENTATION, which claims the benefit of U.S. Provisional Patent Application No. 62/410,779, filed Oct. 20, 2016, both of which are incorporated in their entirety herein by reference.

FIELD OF THE INVENTION

This invention relates generally to project management in a computer network. More particularly, this invention relates to techniques for integrating construction project specifications and related submittal documentation.

BACKGROUND OF THE INVENTION

Building and infrastructure projects vary tremendously. Each project, and its associated structure, is unique due to its design, construction methodology, and geographic location. Project teams, assembled specifically for the requirements of a given project, may have 40 or more entities participating. Teams can differ greatly from project to project.

Construction project participants include an owner and their representatives; a design team of architects, consultants, and engineers; a general (or prime) contractor; and a set of subcontractors in various disciplines (concrete, roofing, structural steel, mechanical, electrical, etc.) who perform discrete portions of the work.

As the primary control mechanism for the project, the project manager employs a master set of project documents which are available to all team members. The documents include the comprehensive set of working drawings, plus a text-based Project Manual. The Project Manual, most often called the "spec book", sets forth requirements for scheduling, payments, product selection, contractor-furnished design, testing, and many other aspects of the project. As the project proceeds, it is not uncommon for addenda to the spec book to be released.

In the early phases of the project, the spec book, through detailed item-by-item specifications, outlines and sets forth the requirements for what will be built. As the project continues toward completion, the documentation expands dramatically to not only define requirements, but also to incorporate the detail of exactly what is being built.

The builders themselves (general and subcontractors) provide the bulk of this documentation. It is intended to demonstrate that each task the builder plans to perform and each item the builder proposes to utilize matches the requirements set forth in the spec book. This process of documenting the response to a requirement is known as "submittal." Typically, at the outset of a project, the general contractor's Project Manager (or architect) will compile a "submittal log" of every required submittal item to track the timing, responsible party and delivery of each.

Submittals, which the builders must deliver to the design team in response to the spec book for approval prior to execution, include items such as schedules, meeting minutes, product data, shop drawings, test data, mockups, product samples, and operations and maintenance data.

Some of these items are for information only. Others require the explicit approval of the design team. In a typical spec book, which can run to thousands of pages, perhaps only one third of that content is submittal requirements.

There are many typical pitfalls and problems associated with common current practices. In the submittal process, each member of the project team reviews, on their own, the sections of the Project Manual which pertain to them. Because each party works independently, they can often interpret requirements differently. Given the volume of content within a typical spec book, exact passages within the specification from which a requirement has been drawn may be overlooked. This often leads to the responsible party supplying incomplete or irrelevant information. Further, keeping requirements up to date and in sync when addenda are released presents difficulties.

Because each participant works from the spec book independently, it is typical that there is double or triple entry of data by the various parties involved. This is time consuming, inefficient and susceptible to error.

In addition, each party may prepare submittals using their own method, most often including manual data entry, and a combination of tools which may include Acrobat®, Word®, Excel®, and/or email. As a result, submittals tend to vary quite a bit in presentation and organization from one participant to the next. This inconsistency of presentation alone makes review for compliance and quality control time consuming and challenging.

The complexity created by the sheer number of submittals due on a typical project make tracking them for adherence to the schedule challenging. When inevitably revisions are requested, this challenge is increased.

After they've been provided, documents are currently treated as silos of information. Correlating any one to the spec book takes considerable time and effort. When there are multiple documents associated with a section of requirements, this challenge is increased. The review process becomes even more time consuming, tedious and prone to error. Further, when looked at in the context of the entire spec book, it is currently difficult to reconcile that every requirement specified has corresponding submittal.

Finally, upon completion of a project, it is considered a best practice to provide "as built" documentation. This consists of the full set of submittals describing what was actually done throughout the project. Assembly of this documentation is time consuming and often an afterthought (low priority) as it does little to generate revenue for the involved parties.

Due to the complexity, scale and cost of construction projects, any mistake raises the probability of litigation and cost overruns. Errors discovered late in a project cost orders of magnitude more to correct than if they are caught and corrected early on. Therefore, a system which makes it easy to accurately and directly convey specific project requirements, which provides direct reference to the pertinent specification for both understanding of the requirement and evaluation of how a requirement is to be met, and which can be easily referred to after project completion to see exactly what was built and who was responsible would be desirable.

SUMMARY OF THE INVENTION

A machine has a network interface circuit for communication with a network. A processor is connected to the network interface circuit. A memory is connected to the processor and the network interface circuit. The memory stores data and instructions executed by the processor to receive a specification book detailing a construction project. Extracted text from the specification book is associated with specification book hyperlinks. Submittal log packages comprising subsets of the specification book hyperlinks are defined. Each submittal log package is associated with a subset of the construction project. The submittal requests are distributed based upon the submittal log packages. Approvals for acts performed corresponding to the submittal requests are collected. The specification book is augmented with the approvals and iterative feedback to characterize evolution of the construction project and construction project documentation.

BRIEF DESCRIPTION OF THE FIGURES

The invention is more fully appreciated in connection with the following detailed description taken in conjunction with the accompanying drawings, in which:

FIG. 7 shows an example of a spec book with highlighted requirement as it would be seen by any user accessing that item for reference at any time during the project or afterwards;

FIG. 12 shows a project sent as a web page for review by a non-registered project participant;

Like reference numerals refer to corresponding parts throughout the several views of the drawings.

DETAILED DESCRIPTION OF THE INVENTION

Figure 1A:
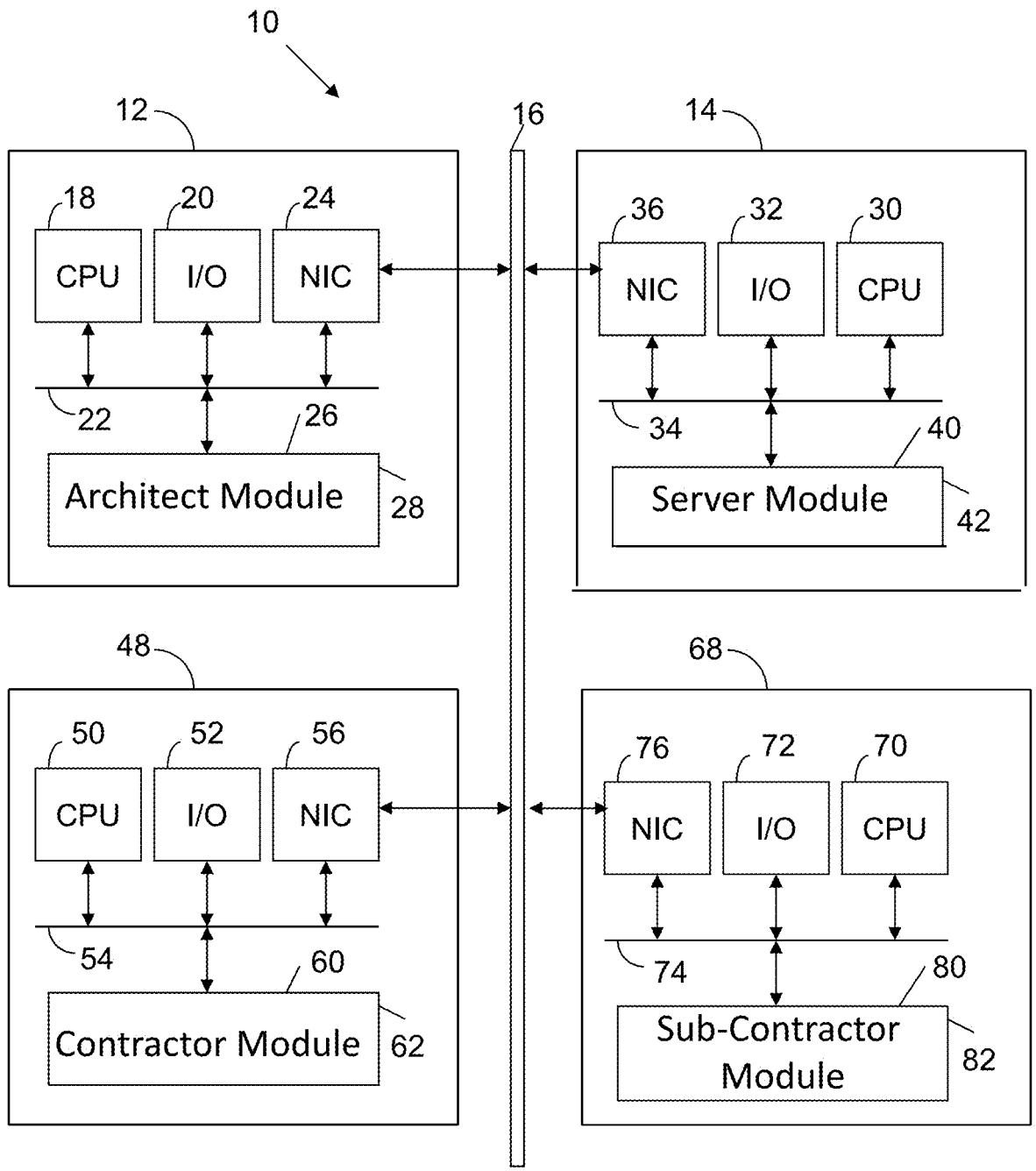
FIG. 1A shows a system configured in accordance with an embodiment of the invention.

FIG. 1A shows a system 10 configured in accordance with an embodiment of the invention. The system 10 includes an architect machine 12 in communication with a server 14 via a network 16, which may be any combination of wired and wireless networks. The architect machine 112 includes a processor (e.g., central processing unit or CPU) and input/output devices 20 connected via a bus 22. The input/output devices 20 may include a keyboard, mouse, touch display and the like. A network interface circuit 24 is also connected to the bus 22 and provides connectivity to network 16. A memory 26 is also connected to the bus 22. The memory 26 stores instructions executed by the processor 18 to implement operations disclosed herein. For example, the memory 26 may store an architect module 28 that is used to generate a spec book that is processed in accordance with the operations disclosed herein.

The server 14 includes standard components, including a processor 30, input output devices 32, a bus 34 and a network interface circuit 36. A memory 40 is connected to the bus 34. The memory 40 stores a server module 42, which implements the operations disclosed herein. In particular, the server module 42 coordinates operations between an architect, general contractor and one or more sub-contractors.

The contractor machine 48 includes standard components, including a processor 50, input/output devices 52, a bus 54 and a network interface circuit 56. A memory 60 is connected to the bus 54. The memory 40 stores a contractor module 62, which implements the operations disclosed herein. In particular, the contractor module 62 coordinates operations performed by a contractor that are subsequently processed by server 14.

The sub-contractor machine 68 includes standard components, including a processor 70, input/output devices 72, a bus 74 and a network interface circuit 76. A memory 80 is connected to the bus 74. The memory 80 stores a sub-contractor module 82, which implements the operations disclosed herein. In particular, the sub-contractor module 82 coordinates operations performed by sub-contractor that are subsequently processed by server 14.

Figure 1B:
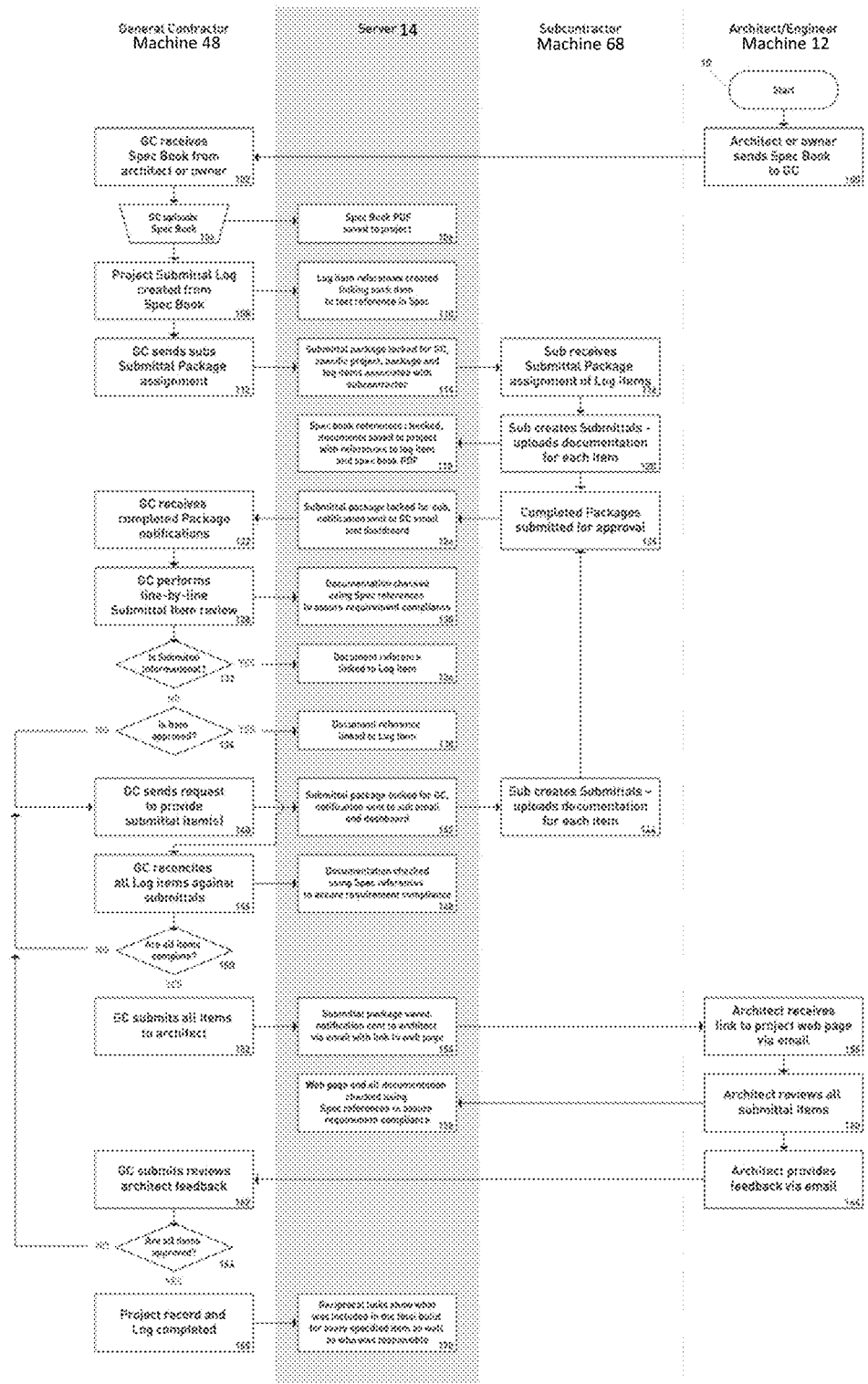
FIG. 1B shows a flow chart of the system and how it implements a submittal process in accordance with an embodiment of the invention.

FIG. 1B shows a flow chart of operations performed by the system 10. Typically the project working drawings, and the Project Manual (spec book), which sets forth requirements for the project in text form, are released to general contractors prior to the bidding process 100. Engagement with the system 10 begins after the architect has developed a project plan, and a general contractor has bid on and been awarded the project. That is, the architect module 28 of the architect machine 12 is used to send a spec book to the general contract machine 48, as shown in Block 100 of FIG. 1B. Block 102 of FIG. 1B shows the general contractor machine 48 receiving the spec book.

One of the first steps in documenting a project is the creation of the submittal log: a list of every item which the spec book indicates must be submitted, with dates and responsibilities indicated. The submittal log is used as a project management and tracking tool. Though in some cases the architect will provide a submittal log, most frequently the general contractor will create their own. For commercial construction projects submittal logs will typically contain thousands of items which must be tracked.

In one embodiment, the contractor module 62 of contractor machine 48 is used to upload the spec book 104 to the server 14. The server, more particularly the server module 42, saves the spec book in a project file 106.

A text extraction tool is used to create the submittal log 108. The text extraction tool may be resident in the contractor module 62. Alternately, it may be deployed in the server module 42. The submittal log avoids re-keying all of the thousands of items, which is currently the most frequently used process. When the text extraction tool is used, the server 14 keeps a record of the location of each item within the spec book document 110. This reference allows anyone reviewing any reference to a log item later in the process to have a link to the specific description of that item within the source specification. This link provides an unambiguous reference as to exactly what is required. This is beneficial when creating the submittal as a response to a requirement 118, evaluating the appropriateness of that submittal during the review and approval process 130, as well as when referring to project documentation after project completion to see exactly what was built 170.

The general contractor module 62 includes prompts to divide and assign project responsibilities between themselves and subcontractors 112 who specialize in various trades (e.g., concrete, roofing, structural steel, mechanical, electrical, etc.). Each subcontractor will review the spec book section or sections they will execute against 118, and will see where they must supply submittals documenting how they plan to perform the work described. These spec book sections are organized to be trade specific. The support documentation required can include product data sheets, construction detail drawings, safety data sheets, warranty information, test reports, certification proof, meeting agendas, and other similar records.

Throughout the process, the system 10 allows projects to be shared by co-workers who are registered users. This is possible whether they are assigners or assignees. When shared, each person has the same editing and reviewing privileges. All messages, notifications and alerts are also presented to all who share the project.

The system 10 allows log item assignments to be grouped by spec book section for convenience, both in assigning to the various trade representatives and later, reviewing the submittal items against the assigned sections. These groups are referred to as "submittal packages."

When a package is assigned 112, the assigner gets a dialog for entering a message to the assignee. This message, along with a link to the assigned packages, may be sent via email as well as by a message within the system. When a registered user logs into the system 10, if an assignment has been made, there is an alert tile indicating the assignment as well as a message panel with the text of the message presented on their Dashboard page 116. If the assignee is not a registered user, they receive a link to the package presented as a web page which they can download in PDF form.

For users of the system 10, these packages of submittal requirements are presented as pre-populated forms to each assignee, thus eliminating need for another person to re-key the data. Each of the items within the package which was generated using the log building tool, has a "view spec" hypertext link to the spec book (which the system 10 sends to the assignee along with the package). This is true whether the package is reviewed by a user logged into the system 10 or is reviewed independently as a web page.

The submittals themselves consist of documentation which must be provided as proof of executional intent, and which must be approved prior to the commencement of the work. For registered users of the system 10, the form provides a mechanism for uploading as many documents as required to complete the submittal item 120. In one embodiment, the system 10 also includes a third-party tool for annotating uploaded PDF documents.

Every uploaded document is added to a "Library" repository for each user. This allows registered users to re-use documents in multiple projects. The access to Library documents is available through the same mechanism with which users upload new documents.

When documents are added to a package, the system 10 creates an association between the text reference in the spec book and the uploaded document such that the document can be reviewed by clicking the highlighted item within the spec book 118. Conversely, the appropriate spec book section can be reviewed by the link in the package associated with that item.

When the package of submittals is complete, the assignee can submit it back to the assigner 126. The assigner receives both an email and a prompt within the system 10 indicating there are submittals to be reviewed. These in-system notifications appear within the user's Dashboard page 122. In this way, the server 14 coordinates communications between the subcontractor machine 68 and the general contractor machine 48.

Both types of notifications link to the appropriate submittal package page, which is now presented with the submittals as supplied, plus feedback mechanisms for every submittal line item 128. If the assigner indicates that any items require revision, the package is returned to the assignee 140. They can then edit the form and provide the revisions requested 144.

The method of assignment and review is extensible within the system 10. If, for example, a subcontractor subcontracts out a portion of their work, the initial subcontractor can assign and review items within the system 10 in the same manner they interact with the initial assigner. This is done prior to the initial subcontractor submitting those items to the initial assigner.

Submittal packages can be split if necessary to accommodate this type of sub-assignment and review. As the project proceeds, each item in the log has elements indicating when it is due, what its current review status is, and who it was sent to most recently. Viewing the project submittal log makes it easy to reconcile submittal assignments: any outstanding or incomplete items are readily apparent 146. The log can be filtered and sorted to enable this.

When the general contractor is satisfied 150, any or all project items can then be submitted to the architect, engineer and owner for review and approval 152. The system sends these as an email alert with a link to a web page 156.

The Architect then reviews all submittals, checking them against the spec book for compliance with the requirements 160. Any or all items can be downloaded from the web page for the recipient's convenience.

When feedback has been provided by the architect, engineer or owner 164, any iterations can be performed and the project or packages can be resubmitted as necessary 162.

Throughout the process, the system records and displays key events on each project page, as well as on each submittal package page within the project. These events are referred to as the "Status History." Each event in the Status History is presented along with any user name and/or email address which relate to that event. Key events include creation, assignment, presentation of submittals for review, submittals opened for review, feedback provided and package splitting.

Each time a package or project is sent, whether as an assignment, for review, for revision, or for informational purposes, the system 10 retains a version of what was sent at that specific time along with any messages which accompanied it. Each of those sent versions are accessible through links in the historical summaries and from the system "Sent" page (which functions similarly to an email client outbox). This creates a full history of the versions and iterations for each package and project.

Finally, when the project has been completed 168, the log links to every specified submittal item and its accompanying documentation. The log also includes details indicating who was responsible for which items and when those items were submitted. The spec book, and any addenda used in generating the log for the project, also have links to the specific submittal item and its documentation within its package. Each line within these packages includes a reciprocal link to the relevant passage within the spec book. These links, together with the revision histories on the project and package pages, provide an "as built" record of the project for future reference. This complete record is an industry best practice 170.

Figure 2:
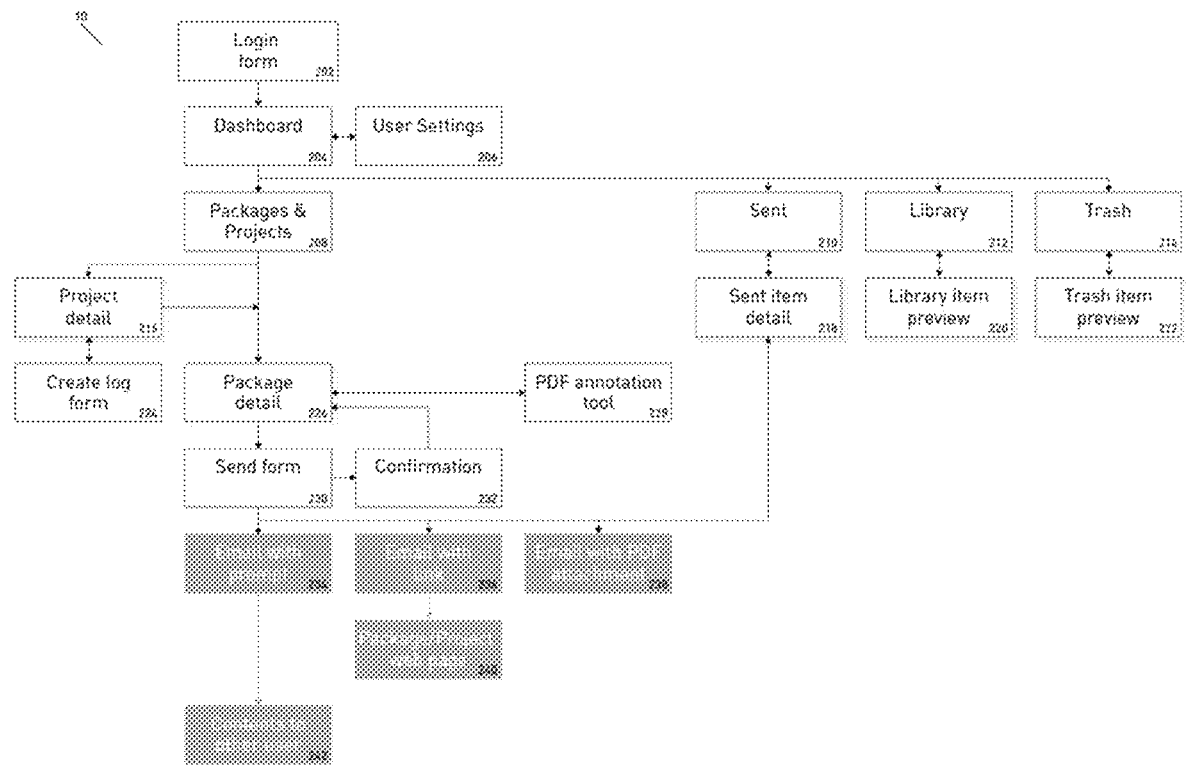
FIG. 2 shows the web-based organization and high-level flow of an embodiment of the invention.

FIG. 2 shows the basic organization and navigational structure of the operations implemented by the server module 42. The main navigational links persistent on the main pages of the system are: Dashboard 204. Packages & Projects 208, Sent 210, My Library 212 and Trash 214. When a user logs in 202, they are presented with a Dashboard summarizing their current projects and tasks 204. The page highlights packages and projects in separate panels based on due dates, whether they have been accessed recently, and whether they have been added to the user's "Watchlist" (which allows users to create shortcuts to any key package or project for their convenience). Users can click into any individual package or project presented in any of those panels. They can also access active packages and projects by clicking on a task summary which takes the user to an appropriately filtered view of the Packages & Projects list page 208.

The Packages & Projects page 208 includes one panel listing all active projects and a separate panel listing all active packages. Both lists can be filtered and sorted to create a tractable and relevant selection. Criteria for filtering include Recently Viewed, Sent, Unsent. Watchlist, Pending. For Review, and Requires Revision. Each line item in each list links to that specific package 226 or project 216 in its current state.

The Sent page 210 is an email outbox analog. It is a filterable and sortable list with a line item including the recipient's email address for every item which has been sent using the system 10. Each line item links to the specific version 218 of that item which was sent at the specific time indicated in the list. The detail page 218 with the version of any sent item also includes any messages sent with that version. These sent versions can also be accessed through their specific line within the historical list at the top of their package 226 and project 216 detail pages. If the Sent list 210 is sorted by Name and then Date time stamp, it reveals version history of any item which has been sent multiple times.

The Library 212 section includes a filterable list of copies of all documents 220 a user has uploaded or received through the system 10. These documents can be easily accessed from within the submittal package form (detail page) 226 to attach to any submittal line item if that is needed. Also, if any PDF in the Library has been annotated using the built-in annotation tool 228 for a specific package or project, the Library 212 maintains both the original version of the document plus the annotated version. Either of those can be re-used as required.

The Trash page 214 is a filterable list of all packages, projects or documents a user has chosen to delete. With controls on each line, a user may choose to restore any item or permanently delete it.

Figure 3:
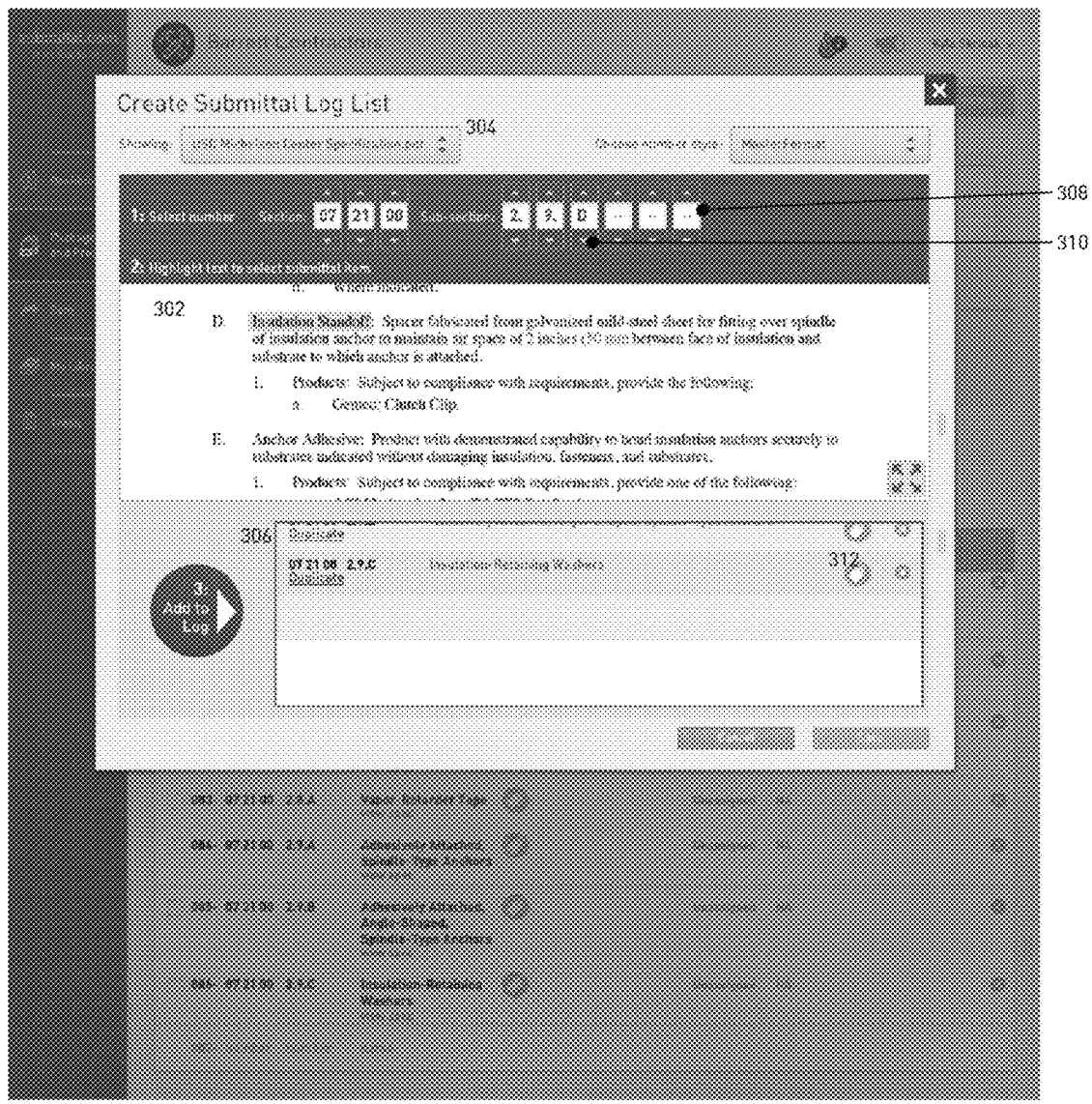
FIG. 3 shows an interface used for ingesting spec book documents and creating submittal log line items in accordance with an embodiment of the invention.

FIG. 3 shows the submittal log building tool. The tool is opened with an uploaded spec book visible 302. The tool is invoked by clicking the "Create Log" button within the "Log" tab of any project detail page. (The other tab. "Packages & Documents," will be described later.) Project detail pages include a header, above the two available tabs, which includes standard text entry fields for project name, project number, contact and project notes. There is also an Add Field button which allows the user to create and name as many additional text entry fields as they deem appropriate. Additional fields created can also be deleted as the user desires. (See FIG. 4)

Below the text entry fields, if a project has been shared, is an expandable list of project team members who share access. The list allows team members to be removed if necessary and has controls for assigning the "Lead" role for the project. (See FIG. 4)

Below that is the Status History area. As described earlier, the Status History is a running list of key events in the project's timeline. It is, in effect, a "paper trail" documenting project transactions. If a message from another Submittal-.com user is associated with a Status History event, that event line can be expanded to reveal the message. The Status History also reflects when items were returned for review and approved or returned for revision if those items were sent to another user of the system 10. The Status History area shows the last 5 events by default, but can be expanded to reveal all events associated with that project (or package). (See FIG. 4)

When the Log tab is selected and the log building tool opened, it is presented as a modal dialog. When beginning a new log, the default state includes an "Upload Spec PDF" button at the top. Clicking the Upload Spec button spawns a browser standard browse dialog. When the user uploads a spec document PDF, the document appears in the scrolling window in the center of the dialog 302. The uploaded document is also added to the Documents table at the bottom of the Packages & Documents tab. (See FIG. 13)

After a specification PDF has been uploaded, the Upload Spec button is replaced by a drop down menu which, by default, shows the name of the PDF currently visible 304. Multiple specification PDF's can be uploaded for any project (for example, if addenda have been released for the specification) and any uploaded PDFs are saved as part of the project. The drop down menu includes names of all uploaded PDFs and allows the view to be toggled between uploaded documents. The menu also includes an option to Upload an Additional Spec PDF.

Users can select MasterFormat log numbering style (an industry standard) or create and save a new custom style based on the particular specification, such as a state DOT. Line items are added to the log list toward the bottom of the dialog 306 by 1) creating a unique number at the top, 2) highlighting a text item in PDF visible in the specification window, and, 3) clicking the Add >button below the specification document. Adding a line item increments the "Select number" counter at the top of the area 308.

Numbers can also be selected manually. In that case, incrementing any number up using the arrow keys above or below the shown value 310 resets any subsequent numbers. For example, if the user has a counter set to 3.7.A.3.b. and increments "A." up to "B.", counter resets to 3.7.B. Using the Tag button on each line item 312, any item added can be tagged as Product data, Shop drawing, SDS, Warranty data, Sample, Schedule, Critical path, Long lead, LEED credit, Equipment Operations manual, Supplemental data, Performance data, Test report, Comparisons report, Certification, Meeting Minutes, Operations & Maintenance, and/or Closeout. These options are the standard submittal item categories and tags applied can be used to filter the log list after the dialog is dismissed. (See FIG. 4)

Figure 4:
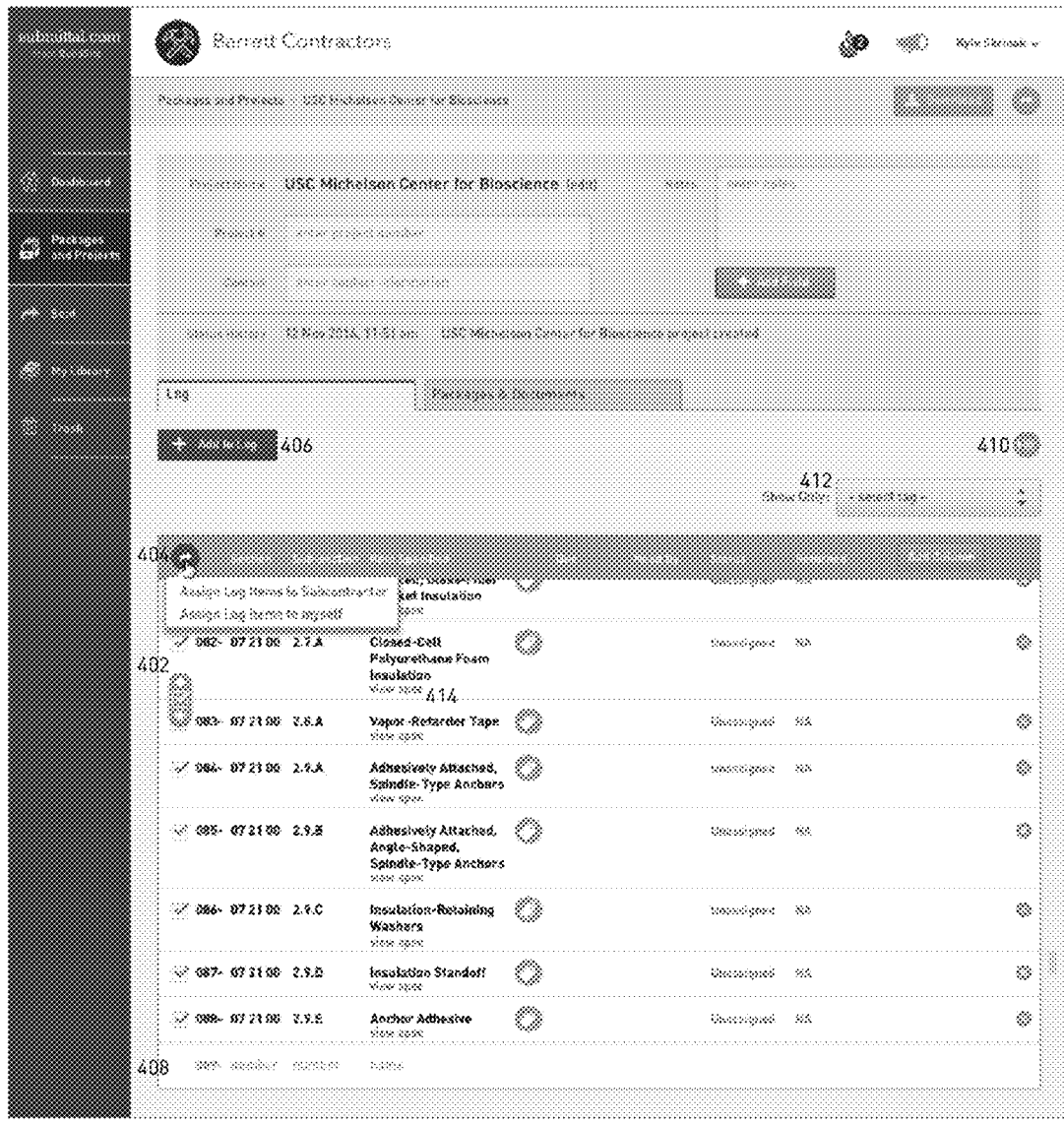
FIG. 4 shows an assembled submittal log within a project's page with mechanisms for selecting and menu for assigning log items in accordance with an embodiment of the invention.

FIG. 4 shows the project page after the submittal log tool dialog has been dismissed. Many log items which have been added using the tool are visible in the list 402, and are shown selected for assignment (note the checked boxes on the left of each line item). The button in the upper left 404 of the list opens a menu which allows users to either create a package for themselves from the selected items or assign the selected log items to someone else as a package.

Above the list, the default "Create List" button changes state to "Add to Log" 406 after a list has been created in dialog. Clicking this button re-opens the modal dialog for editing. Log line items can also be added to the list using the form fields in the bottom row 408. However, items entered directly in the list will not have an accompanying link to the spec book as described below.

Also above the log list, the button in the upper right 410 opens a menu which allows users to export the log to Excel, download the log as a PDF, send the log, or edit the log directly. If the log is exported to Excel, columns are added for "Tags", "Sent to" and "Sent" (date). Below the menu button is a control 412 which allows the list to be filtered by any individual tag which has been associated with line items. The list can also be filtered to show All Revised Items (items which have been edited or changed in the assignment and review process), or All Log Items.

Within the list, each line item which was created by highlighting the specification PDF text in the tool dialog has a "view spec" link 414 which, when clicked, opens the specification PDF to the page that item came from. The specific item text in the PDF is highlighted to call it out.

Note that the "view spec" links 414 are persistent in every package created from the log, and are visible to everyone who sees any of the project packages at any time during the project or after it is completed. These project PDFs, when opened, also have reciprocal links to every submittal line item in packages which were generated from them. This allows users to see what was actually submitted for any assigned item in the spec book. Once log items have been assigned, the due dates and the status, "Assigned," are displayed for each. (See FIG. 11)

Figure 5:
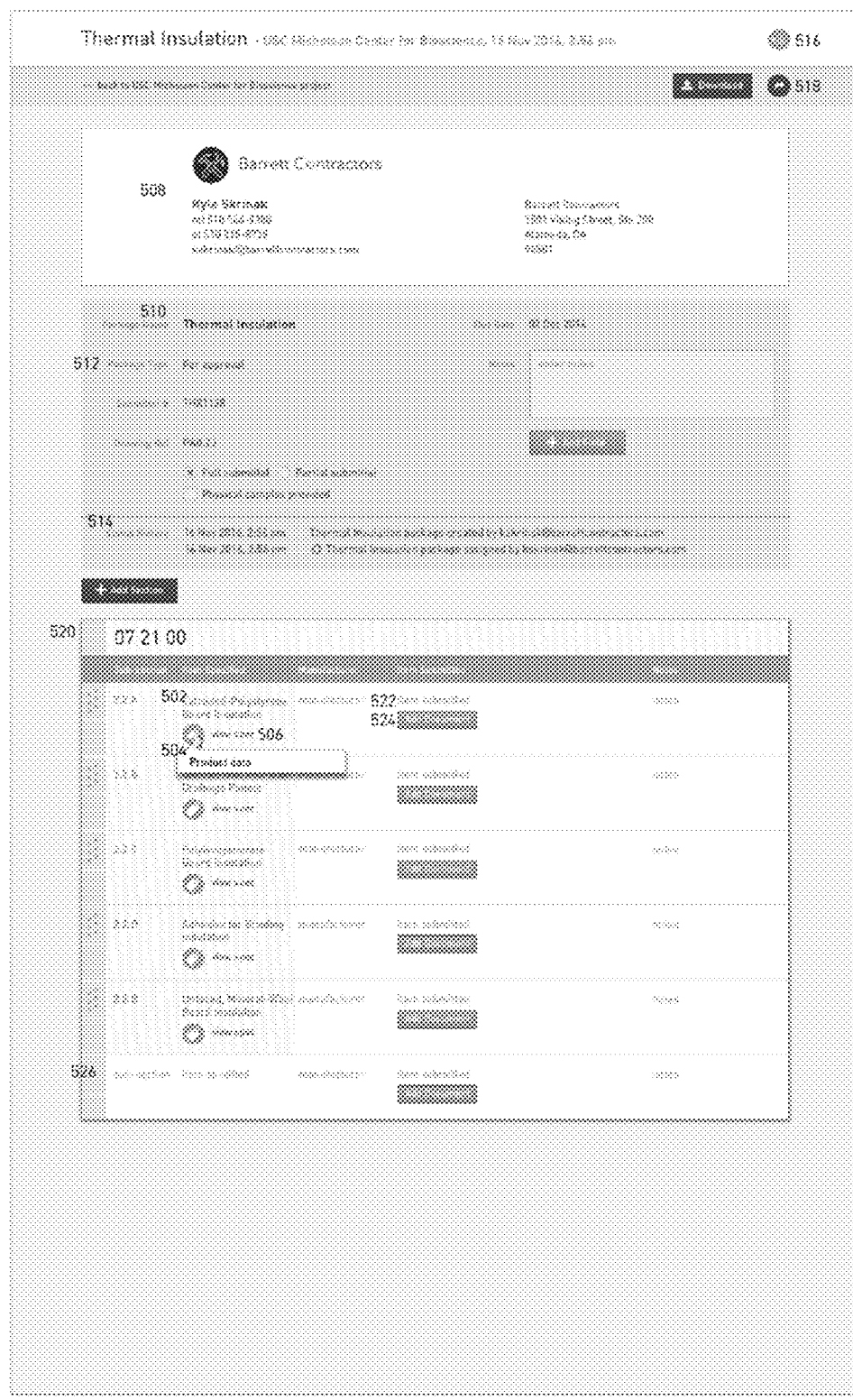
FIG. 5 shows a "package" of assigned submittal items in a pre-populated interactive form as viewed by the assignee.

FIG. 5 shows an assigned package detail page as viewed by the assignee. It is shown here before submittals have been added. In the case shown, the items specified by the assigner to be submitted pre-populate the form 502. The tag on the first line item 504, added by the assigner in the submittal log, is shown revealed. The Package detail page is a modal, editable form. Each item also includes the "view spec" link 506 described earlier.

At the top of the package, under the title bar, the assigner's company contact information 508 is displayed. This is followed by the package header 510, which includes industry standard transmittal form data. The package name, type, submittal number, drawing reference and due date are only editable by the user who created the package. If the package type 512 is "For your information." items in the package do not require the approval process. As on the project detail page, the Status History 514 for the package is displayed.

In the upper right-hand corner of the detail page, above the header content, is a contextual menu button 516 allowing the package to be Split, Duplicated, Downloaded. Moved, Added to the Watchlist, Deleted or Archived. The round Send button 518 below it includes contextually driven options for Submit, Assign, Return, Collaborate (share with a co-worker) and/or Forward. Options displayed at any given time reflect the specific state of the package in the process.

These options allow users to submit package items to assigner, submit package items as a web page to non-users, assign package items, return package items for revision, share package with coworker, forward package as a web page.

The table below the headers is referred to as a section 520. Sections in a submittal package are typically added to correspond to sections in the spec book. Users can add as many sections to a Package as they like. Each section is a discrete table. Line items within any section table can be dragged and dropped to rearrange them. Section tables themselves can also be dragged and dropped to change their order.

To complete each line item, the assignee fills in manufacturer, items/products specified 522, any notes they think appropriate and attach the appropriate support documents for that item. When the Add Document button 524 is clicked, documents can be added to a line item by either 1) dragging the document into the target area which opens in line. 2) browsing for the document on the user's local drive (through the standard OS browse dialog). 3) browsing their My Library content, or, 4) searching the product database on the server 14 (See FIG. 6). Assignees can also add additional line items 526 to submit to the assigner if they feel it is appropriate to do so (if, for example, there is a detail the assigner has not accounted for).

Figure 6:
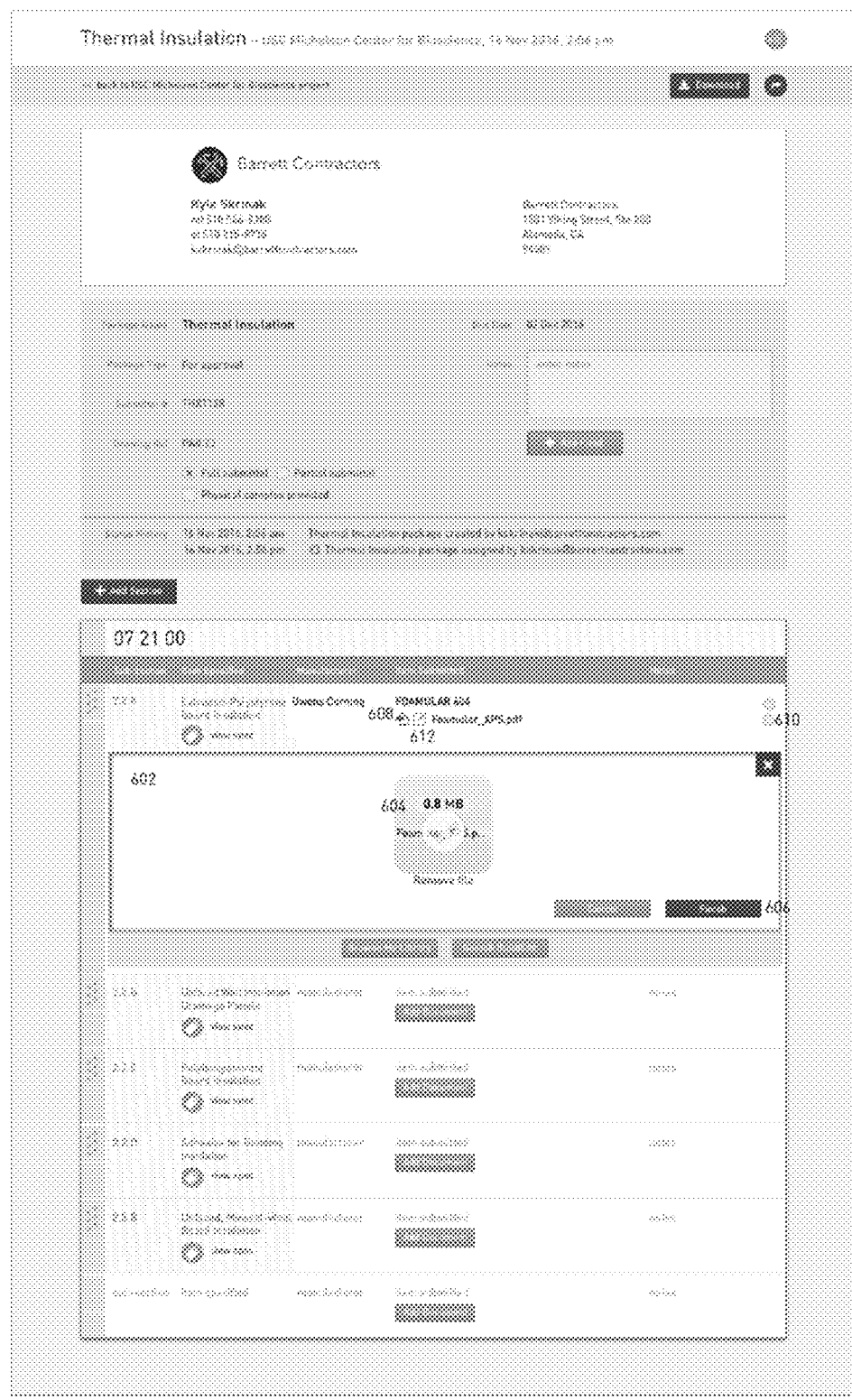
FIG. 6 shows the interactive form including document upload mechanism in the process of completion.

FIG. 6 shows the same assigned package as FIG. 5 as it would appear in the process of adding documentation to the first line item. The document drag and drop target area 602 is shown open and one PDF document has been added 604. As many additional documents as desired can also be added. When all desired documents have been added to the line item, clicking the Finish button 606 dismisses the target area and the documents are displayed in line with standard icons 608 reflecting the document type (PDF, XLS, DOCX, etc.). Any documents can be deleted by clicking the X icon 610 to the right of the document name.

PDF documents attached to the package can be annotated by clicking the grey icon 612 to the right of the PDF icon. This invokes the application's modal annotation tool. Once annotated, the icon changes from grey to green to indicate it includes an annotation.

FIG. 7 shows a sample spec book page opened from the "view spec" link within the first line item in the submittal package shown in FIG. 5. The spec book is opened in a new browser tab and jumps to show the highlighted submittal item 702 in situ with accompanying requirement text adjacent to the highlight. (Note that content shown is typical for a spec book.)

Figure 8:
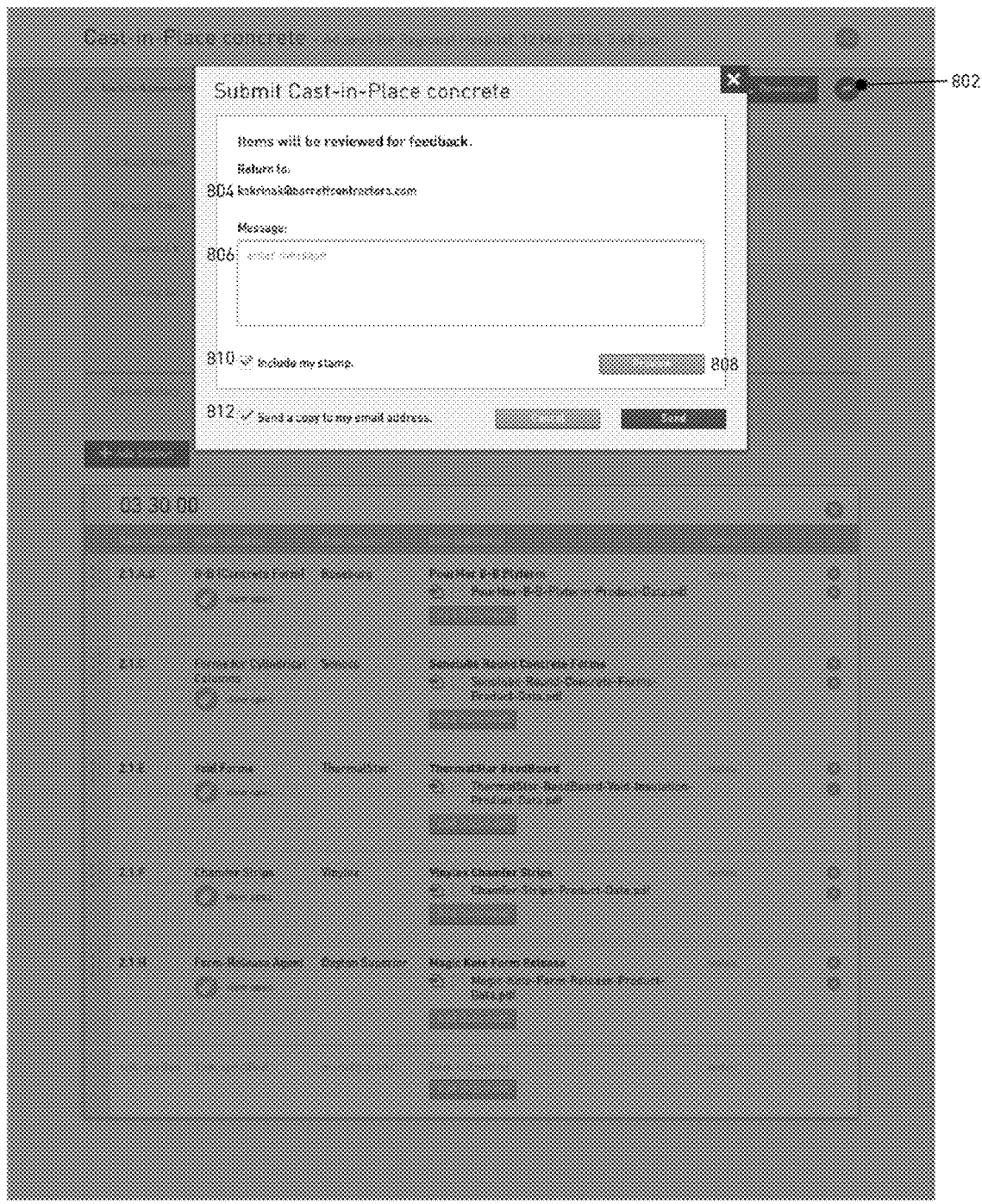
FIG. 8 shows the dialog invoked by an assignee in order to submit package of assigned items.

FIG. 8 shows the opened Submit dialog over a completed submittal package detail page. The dialog is invoked through the menu associated with the "Send" button 802 (the dark blue button with the standard send icon arrow, seen partially obscured by a grey isolation layer) in the package's upper right-hand corner.

In this case, the sending dialog has the assigner's email address 804 shown. This is the only option possible for this assignee to submit this package to. The assignee can add a message in the text field 806 if they choose to. This message will be delivered to the assigner's email account and will appear in the Messages panel on the assigner's Dashboard (see FIG. 9). Any message included can also be revealed in the submitted Status History event on all detail pages for this package.

Within the dialog, as with all sending dialogs in the system 10, the user has a button to Preview 808 the package before they send it. The preview opens in a new browser tab and displays exactly what the recipient will see when they open the package from one of the links the system sends them.

The user also has options to include their "stamp" language 810 (specific company legal copy associated with submittals) and to send a copy of the message to their own email account 812 for their records. Both options are checked by default.

Figure 9:
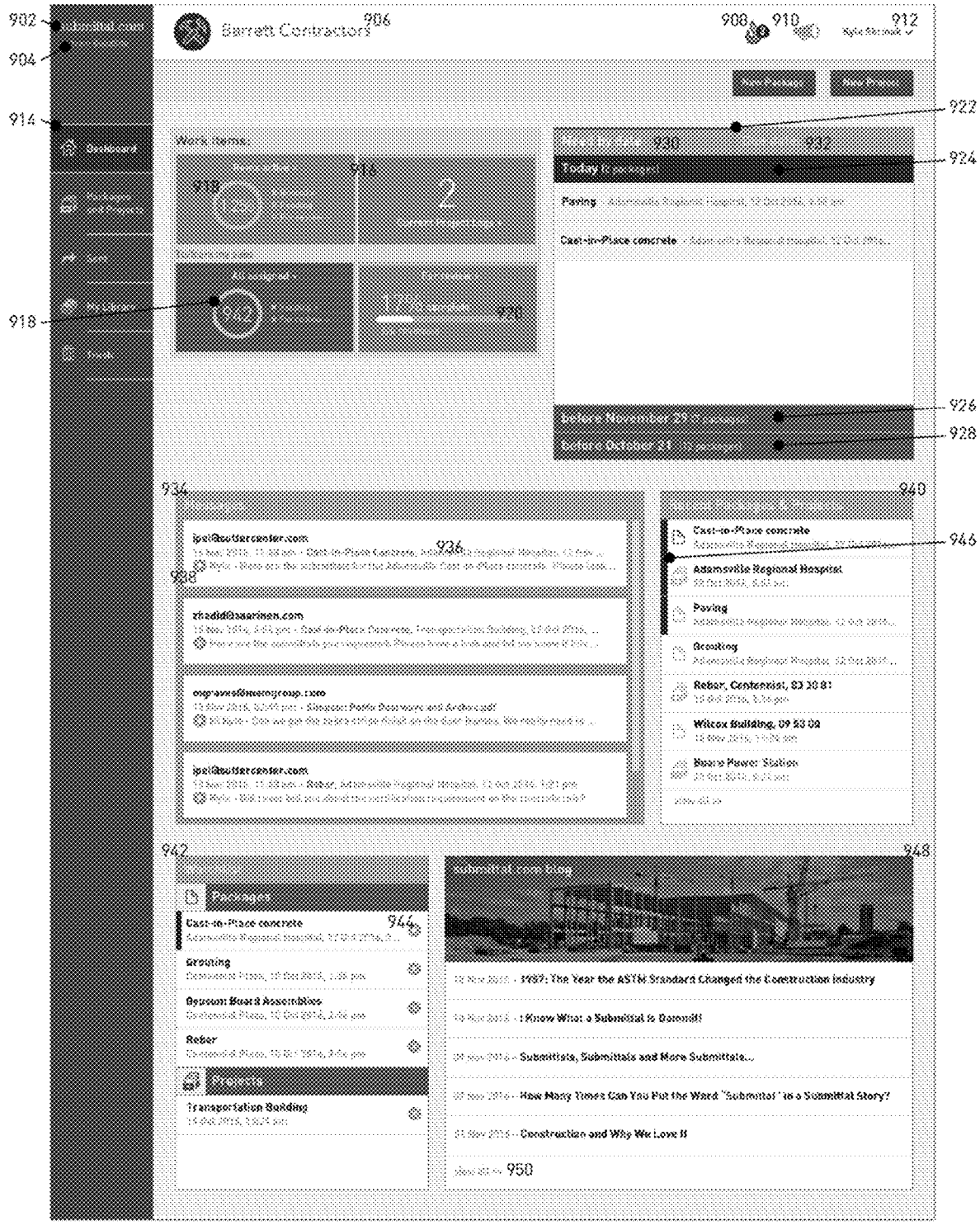
FIG. 9 shows the assigner's view of the "dashboard" with date-driven alerts, messages and interactive project statistical summaries in accordance with an embodiment of the invention.

FIG. 9 shows the Dashboard page supplied by the server module 42. In this example, the server module 42 is implemented at the address Submittal.com. There are two views of the Dashboard with similar but distinct content: one for GCs and one for Subs (the view shown is GC version). The appropriate views will be served based on which role the user has selected in the registration process.

The Dashboard page establishes the basic page architecture used on the high-level pages of the system 10. On top-level pages throughout the system 10, the primary header area includes: the Submittal.com word mark 902 and a link to a parent entity BuildSite.com 904, the user's company name or logo 906 (if they have uploaded it within the Settings area), a heads-up indicator (flame icon 908) is present to call attention to items which are either overdue or due today (clicking it takes user to Packages and Projects page filtered for Overdue plus Due Today), a megaphone icon 910 which invokes a dialog to allow users to recommend Submittal.com to multiple email addresses, and the user's name 912. The user's name 912, when clicked, opens a menu which contains links to allow the user to log out, access the Settings page (where users manage their profiles), email product support or access a simple product tour and tutorial content. Primary navigation 914 appears on the left side of the page.

In both views of the dashboard, highlight tiles 916 in the upper left present a simple indication of work the user should focus on. The highlight tiles indicate logs being built, newly received submittals, items which have been sent out, and items which have been returned and are either approved or need revision. The tiles presented are relevant for the user type (i.e., GC or sub). Some tiles include a donut chart 918 or a bar chart 920 as a graphical indicator of how much work has yet to be completed. Each tile or text link takes the user to a filtered view of the Packages & Projects page with only Packages and Projects containing the appropriate items shown. For subcontractors, values for New Assignments are also displayed. They are removed after project or package has been visited.

The "Due" panel 922, in the upper right-hand corner, is a window-shade presentation. The "Overdue" header 924 is 1) only present if something is overdue, and, 2) open by default if it is present and populated. Overdue items are removed 7 days after due date if they are not attended to. There are two other window shade sections which are filtered by rolling dates. The first of these 926 shows items due in the next two weeks. The final section 928 shows items due within the next month. For any user who has assigned items, there are two tabs: Need By Date 930 and Due Date 932. Both can be also used to filter the list.

The Messages module 934, on the left in the next row, contains a line displaying the message 936 from each package or project the user has received since they last visited. The Messages are retired from that module once their package or project has been visited. The panel scrolls if there are more messages than can be accommodated by the module height. If any message is longer than a single line, a hide/show control 938 will be visible at the left end of the line which expands the line to show the full message.

The Recent Packages and Projects panel 940, on the right in the second row, shows the 15 most recent packages or projects the user has interacted with. The list scrolls within the module if necessary.

The Watchlist panel 942, in the bottom row on the left, contains packages and projects which the user has flagged for inclusion. Each line contains an "X" button 944 which allows the item to be removed from the list. The list scrolls within the module if necessary. Drop down menus for packages and projects throughout system 10 will include "Add to my Watchlist" option. If a package or project is already on Watchlist, the menu option changes to "Remove from my Watchlist." The Watchlist panel is not visible if the user has not added any items.

Line items in all of those panels link directly to the appropriate package or project page. Packages and projects shown in lists throughout the system 10 will also include color highlighting bars 946 on their left to call attention to new items requiring consideration, items requiring revision, items for review, items overdue, changed or unrequested added items, and bounced messages.

The Blog panel 948, in the lower right-hand corner of the page, contains links to the most recent article postings in the blog accessible through the public-facing Submittal.com web site. The "View all: >>" link 950 takes the user directly to the landing page of the blog.

Figure 10:
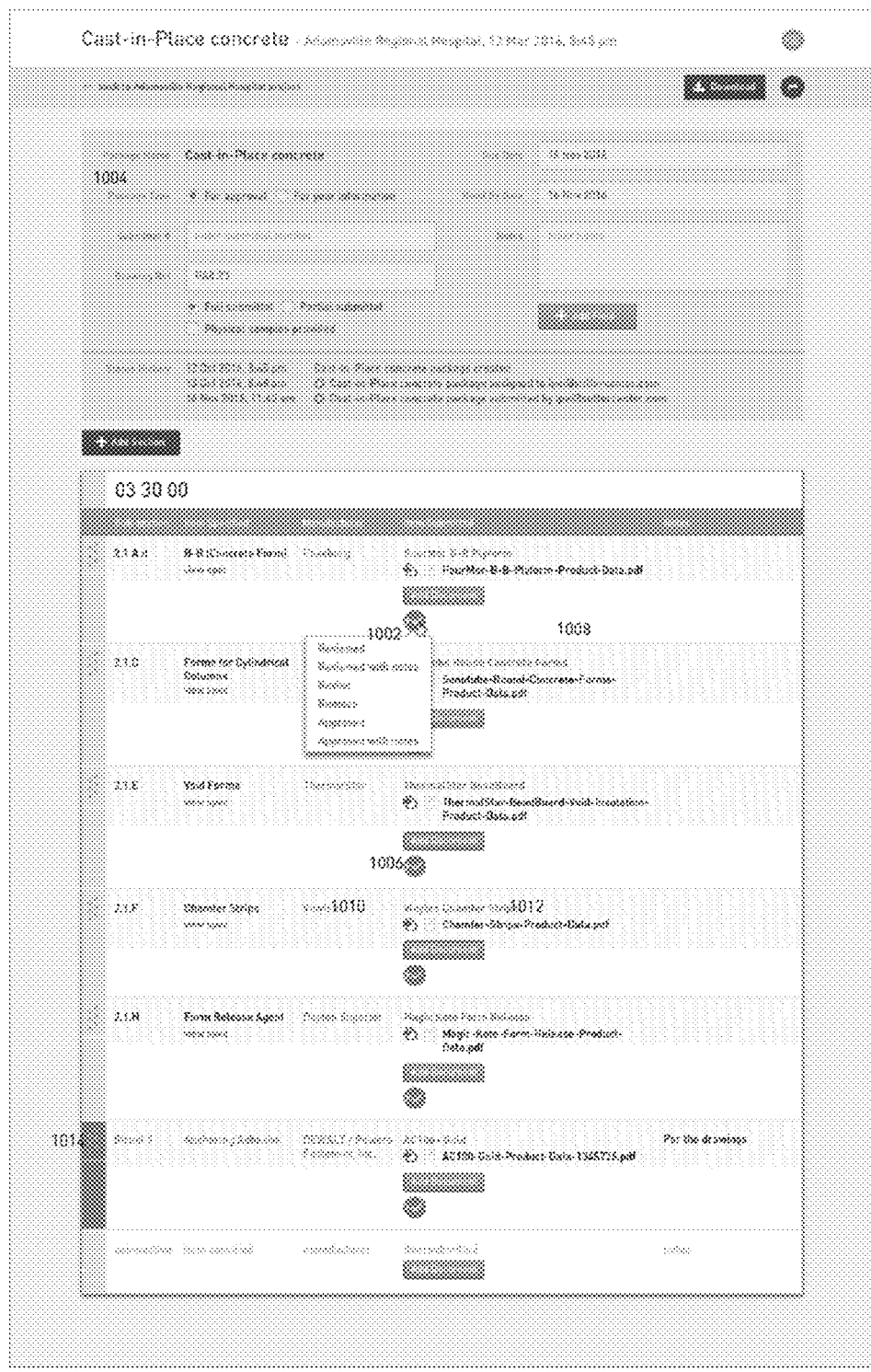
FIG. 10 shows the assigner's view of a package of items submitted for review with review menu showing and color highlighting to focus attention on contextually important details.

FIG. 10 shows a package detail page which has been submitted to its assigner. The feedback menu for the first line item 1002 is shown opened. Note that the transmittal data in the header 1004 is editable for the package creator/assigner. Feedback options are limited to Reviewed. Reviewed with notes. Revise, Remove (also opens notes field), Approved, and Approved with notes.

When any item in a package is marked with either Approved option, before they see the send dialog, the user needs to confirm that they understand that Approved status will permanently lock the item. Any item marked Approved or Approved with Notes and returned down to assignees becomes locked.

Items marked either Approved or Approved with Notes and returned to an assignee are considered final and resolved. They no longer count in the open tallies in the dashboard (see FIG. 9). Items marked either Reviewed or Reviewed with Notes and returned to the assignee and are considered resolved, but perhaps not final. They no longer count in the open tallies in the dashboard either.

At review levels below the top of the creation chain (i.e., sub-assignees), "Approved" options are not available. That is, if a sub assigns items to another sub, in review phase they can give feedback as "Reviewed" but never "Approved" (they would never see either Approved option in their menu).

Only the assignee who is responsible for a line item (i.e., they have provided the submittal documentation) may edit the line item if it has been returned marked either Revise or Remove.

If a first-level assignee has a package returned to them with either Revise or Remove status indicated, and that package had been assigned to another user, the first-level assignee must manually Return the package to the second-level assignee (though they cannot make the edit themselves). When the second-level assignee re-Submits the package, the line item must go through the standard feedback cycle with the first-level assignee before the second-level assignee re-Submits it to the original assigner.

It is the assignee's responsibility to either remove or revise an item which they are directed to. That is, if an assignee has received one line item that is marked Revise and another marked Remove, they may Submit the package again without having made any revisions or removals the system 10 will allow them to do so without interference (though it would be best for them to explain why they have not in their message when they submit it again). In such a case, the assigner will most likely return the package with the Revise and Remove indications still in place, but the system 10 will not intervene in the transaction. If this happens, when the assigner first re-opens the package, the feedback menu buttons and the states Revise and Remove will be visible and bright blue 1006 (as they are in conflict with what the assigner expects and represent a variance).

Selecting either the Approved with notes option, Reviewed with notes option, the Revise option or the Remove option opens a notes text input field immediately to the right of the feedback indication 1008. When viewed by recipient, if the note exceeds 40 characters, only the first part of the note is displayed, the truncation is indicated with an ellipses and the note includes a circular hide show affordance (this case is not shown). Clicking the affordance opens up the table row to reveal the full note.

After a package is submitted or resubmitted, the menu buttons are not present for the assignee and the "Pending" state is displayed for any unresolved line items. The Pending state is replaced when any state is Returned by the assigner. Any line item which is added by any assignee, submitted and then marked Reviewed or Approved, is then automatically added to the project submittal log.

Throughout the system 10, the bright blue color shown here 1006, 1010, 1012 is used for names and interface elements to highlight items which should be attended to or variances from specific requests. In the first five lines of the example shown, submittal manufacturer and item submitted names are highlighted along with the buttons which contain the feedback menu because the assigner has not seen these yet. In the last line item 1014, the whole line is highlighted to indicate a full line item added by the assignee which is a variance for the assigner. After the page has been visited, the blue highlight is dismissed and the items appear in their default colors.

Figure 11:
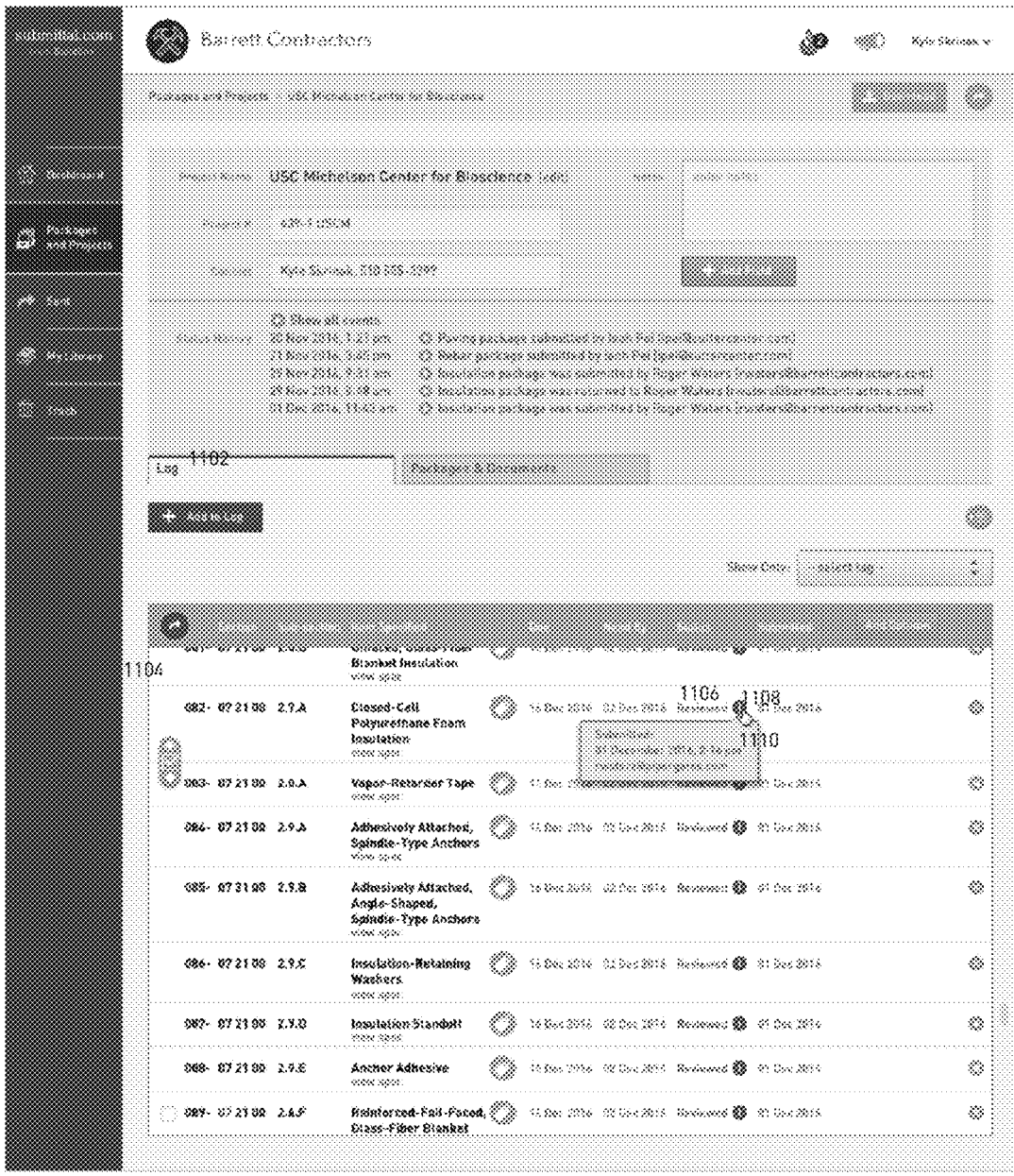
FIG. 11 shows the assigner's view of the submittal log within the project's page with assignment dates, status and status details for one item revealed.

FIG. 11 shows the project page with the log tab 1102 selected. The state shown is later in the process than FIG. 4. In this case the log items 1104 which are visible in the list have all been assigned, submitted and reviewed. Each line item status 1106 (in this case "Reviewed") is a link to the package detail page that item belongs to.

When it is clicked, the information icon 1108, which first appears on all line items after the package has been assigned, shows who the package was sent or assigned to along with a time stamp. The second line item in FIG. 11 shows an example 1110.

Figure 12:
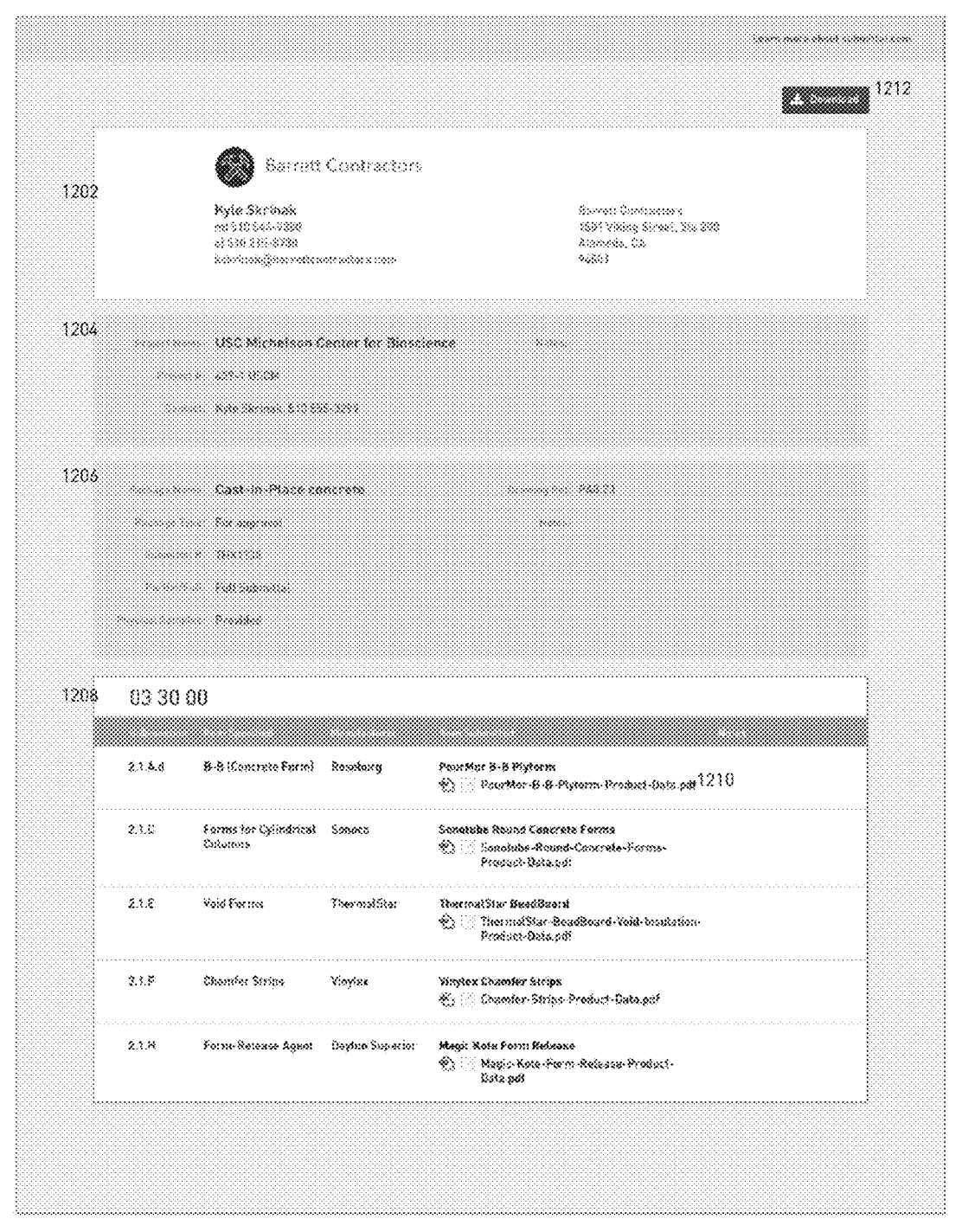

FIG. 12 shows a package which was either submitted or forwarded to a recipient who is not a registered user. When a registered user sends either a package or a project to an email address the system does not recognize, any message the sender entered in the dialog is included in an email to the recipient. The email also includes a link to a web page like this one. When the email link is clicked, the Status History on the originating package and/or project page(s) records that the package or project has been viewed by that specific recipient.

At the top of the package web page 1202, the sender's company contact information is displayed. This is followed by the project 1204 and package headers 1206 containing the industry standard transmittal form data. Below those blocks is the Section table 1208 with line items and documents included. All of these sections are read-only data. If there are multiple sections or packages, they stack in order of the original package or project within the page.

Recipients who visit the page can view any attached documentation by clicking the document's name 1210. If they like they can also choose to download the entire package or project to their desktop for their records by clicking the Download button 1212 in the upper right.

Figure 13:
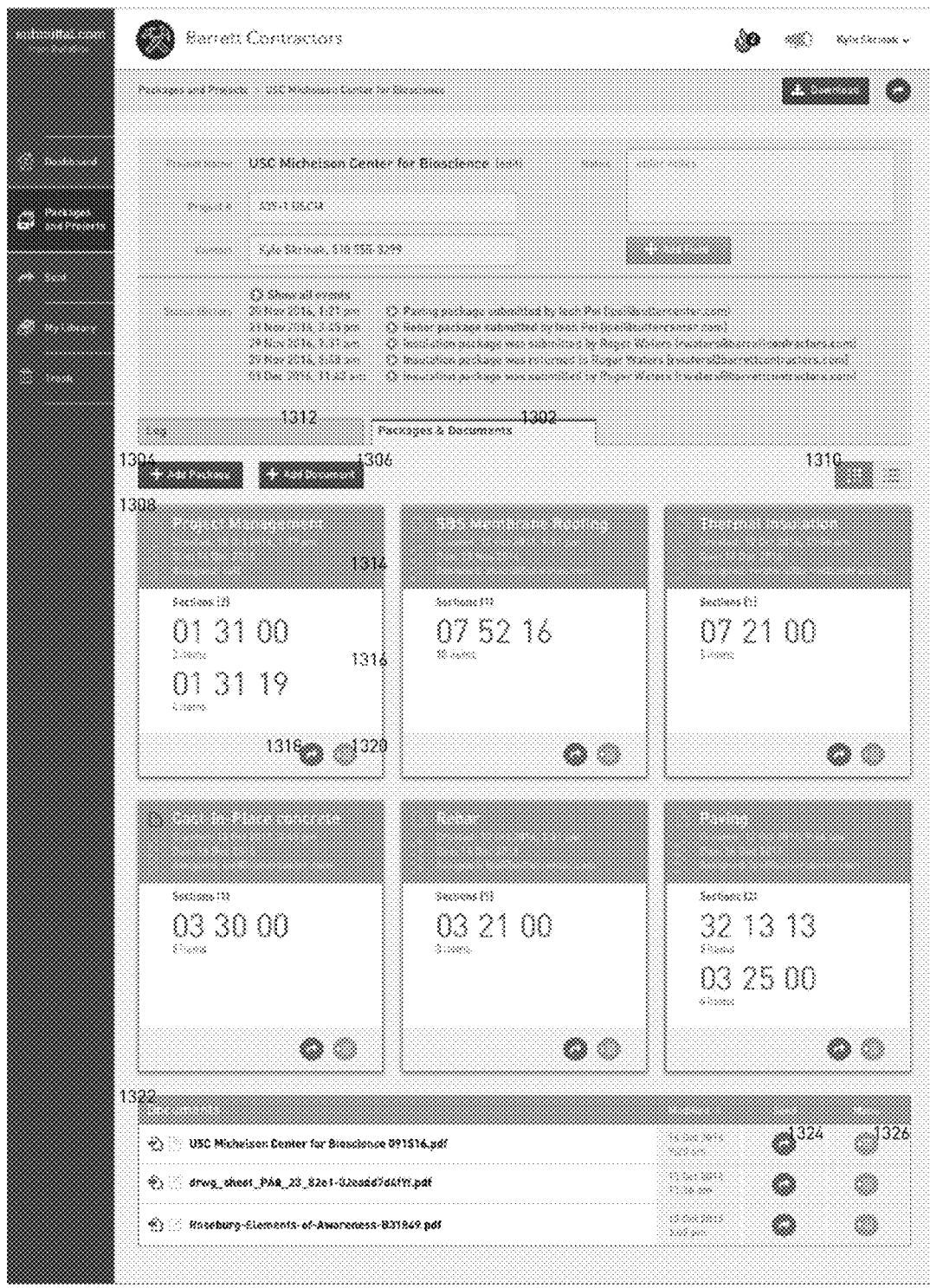
FIG. 13 shows an alternate tab view of the project's page with "cards" representing each package of submittal items as well as table for displaying uploaded project documents.

FIG. 13 shows a project detail page with the Packages & Documents tab 1302 selected. Below the tab set are buttons allowing the user to add new packages 1304 or new documents 1306 to the project. Packages are displayed as "cards" 1308 in grid view (shown) or line items in a table in list view. The view control toggle is within the tab and above and to the right of the package cards shown 1310.

Any user who has been assigned a package automatically gets a copy of that package's project page, although only packages assigned to them will be visible. Their view of the project's submittal log will also be limited to items they have been assigned. That is, if an assigner has a project with ten packages and assigns two to a single subcontractor, that subcontractor will have access to the project detail page with only those two packages showing in the Packages & Documents tab 1302. Also, only the items from those specific packages will be visible in the log they see within the Log tab 1312. They will also get any spec book or addendum which has been uploaded in the log creation tool within the Log tab.

Package cards 1308 (or line items in list view, which is not shown) allow the user to access the package detail page by clicking them. Package cards 1308 display key package information. In the card header 1314 are the package's name, when it was created, its due date and who it is assigned to (whether the creator themselves or another assignee). Below the card header is a summary of the package contents 1316, including the number of sections it contains and the names of those sections (shown with the number of items in each section). A simplified version of this information is displayed for each package in list view.

Each card 1308 (or line item in list view) has buttons visible which allow the user to send the package 1318 as appropriate for its state, or after clicking the contextual menu button 1320, Split. Duplicate. Download. Move, Add to Watchlist, Delete or Archive the package. The Send button 1318 always allows sharing.

Package cards 1308 (or line items in list view) may be reordered by dragging and dropping them. For a project creator, adding individual packages under the Packages & Documents tab 1302 by clicking the Add Package button 1304 adds any items added to that package automatically to that project's submittal log. For an assignee, items in any new package created by clicking the button will only be added to the log if the package is submitted and those line items are marked Reviewed or Approved by the project originator.

Below the package cards 1308 (or list) is a table for any loose documents 1322 which have been added using the Add Document button 1306 within the Packages & Documents tab 1302. If any spec book or addendum has been uploaded in the log creation tool within the Log tab 1312, those documents are automatically added to this table too. Buttons on each line in the table allow that document to be sent 1324 individually or, under the contextual menu made visible through the button 1326, Duplicated. Downloaded. or Deleted.

Figure 14:
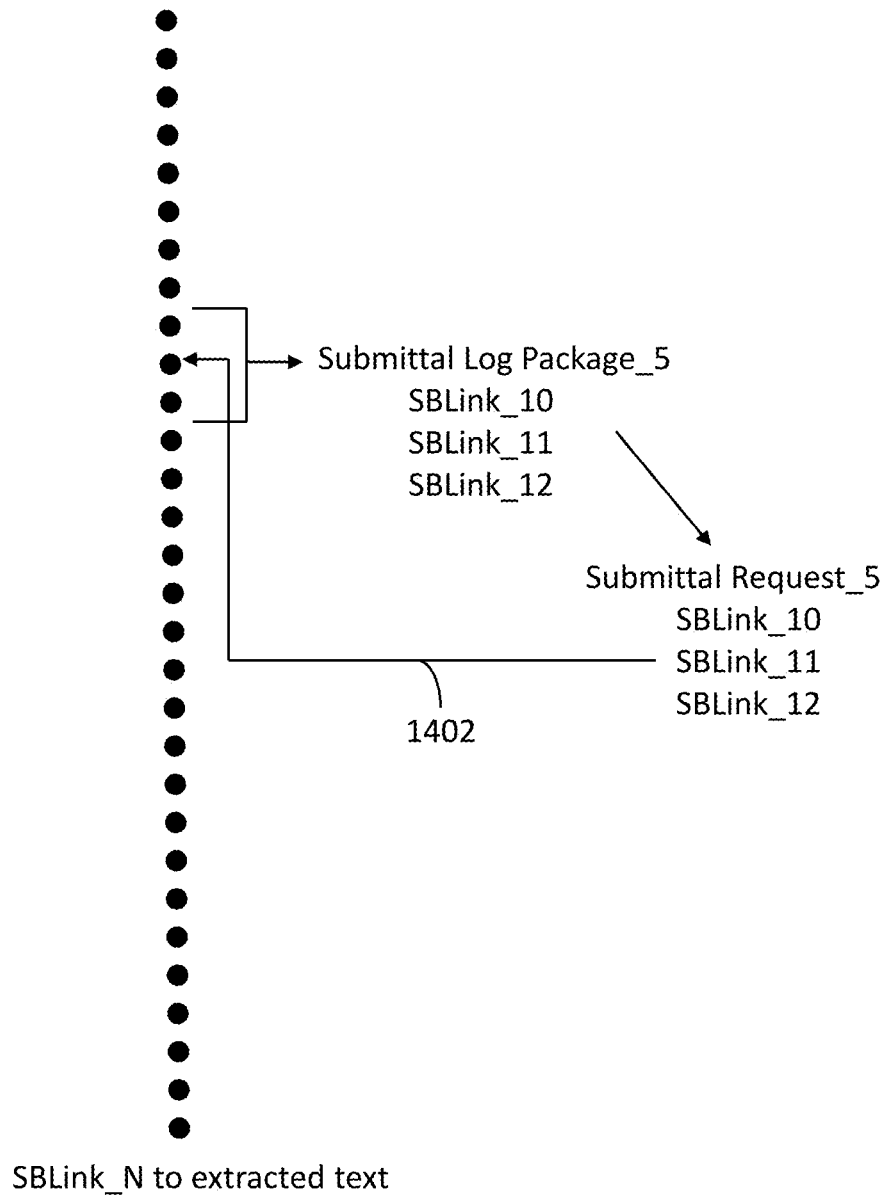
FIG. 14 illustrates the relationship between a spec book, submittal log and submittal requested associated with an embodiment of the invention.

FIG. 14 illustrates a specification book 1400 comprising a set of specification book hyperlinks (SBLink_1 through SBLink_N). The specification book 1400 may include an original set of text plus specification book addenda with addenda text. Each specification book hyperlink is to extracted text of the specification book. The extracted text may relate to a material requirement, a work requirement or combinations thereof. The extracted text may be assigned section and sub-section numbers, as demonstrated above (e.g., FIG. 3). Similarly, the extracted text may be highlighted and annotated, as demonstrated above (e.g., FIG. 7).

A subset of specification book hyperlinks are associated with a submittal log package, in this example submittal log package 5 comprising specification book hyperlinks 10 through 12 (SBLink_10, SBLink_11 and SBLink_12). In turn, the submittal log may be used to derive a submittal request, in this example submittal request 5 comprising specification book hyperlinks 10 through 12 (SBLink_10, SBLink_11 and SBLink_12).

As previously discussed, each submittal requested is a pre-populated interactive form for distribution to sub-contractors. Also demonstrated above is that each submittal request has prompts for uploading documents associated with the submittal request. Thus, for example. SBLink_11 may result in a data upload to the specification book 1400, as shown with arrow 1402.

A submittal request may also include prompts for approval of a material or an assigned task. The approval may be by a sub-contractor for work performed by a sub-sub-contractor, approval by a general contractor for work performed by a sub-contractor, approval by an architect for work performed by a general contractor. Thus, the approval may be logged at the sub-contractor machine 68, the general contractor machine 48 or the architect machine 12. Alternately, the approval may be logged at the server 14 while the respective individuals are logged onto the server 14. Regardless of where the approval is logged, the server 14 maintains a record of each approval. The collection of approvals constitutes the as-built integrated record constructed in accordance with the invention. That is, the original spec book 1400 is annotated over time to include approvals, dates, records of contractors and sub-contractors, records of materials, and the like. Each annotation is associated with a spec book link.

Thus, the disclosed system provides a means of linking specific requirements as outlined in a spec book, with the responsible party, and the documents they provide to describe their execution of each requirement. The system is readily accessible through the internet by all involved in the project, both during the construction process, and after completion, as a record of the existing structure as built.

The method and apparatus described allows a general contractor to upload the spec book, create a log of every required submittal item for the tracking of the requirements, and assign responsibility for each item. Key industry and contractual terms can be highlighted within the uploaded spec book as an aid in understanding the project and creating assignments. By utilizing the tool in the application to create the log, every item within the log has a hypertext link to the specific text in the spec book from which the requirement was derived. In the assignment process, due dates are included to allow tracking of each item within the project schedule.

The assignment process provides the assignee with pre-populated interactive forms, eliminating the need to re-enter data. The forms demonstrate exactly what the assigner expects in response to a given requirement. They are also editable to allow the presentation of unforeseen elements. The link provided within the forms can be used by the assignee to ensure that their intended method, product or solution does, in fact, meet the specific requirement the assigner intended.

The system includes date-driven alerts to keep the assigner and assignee aware of their schedule. The submittals returned through system also contain the link to the appropriate reference in the spec book. This simplifies quality control in assessing adherence to the requirements. The system includes a mechanism for item-by-item feedback to the assignee. It provides alerts to them to let them know if any given item is approved, requires revision or is rejected outright. Any assignee can then respond or revise if necessary.

As a project progresses, the assigner can easily track the status of any individual item. They have access to any version which was submitted, and so can see the historical progression of supplied documentation. The updated log enables full reconciliation of the submittals in order to ensure all project obligations are complete and met.

In another aspect of the system, each uploaded spec book and addendum used in creating any log item is highlighted and includes a reciprocal link to the documents submitted to fulfill that specific requirement.

Upon completion of the project, an integrated record is available through the network as a permanent record of the completed project as it was actually executed. It includes highlighted specification documents, final documentation for every item in the log, revision history of any items that may have required iteration during the approval process and references for who was responsible for each item.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A documentation system for a construction project, comprising:
   a server comprising:
      a network interface circuit for communication with a network;
      a processor connected to the network interface circuit; and
      a memory connected to the processor and to the network interface circuit, the memory storing data and instructions executed by the processor;
   a specification book document that is received over the network and stored on the server, wherein the specification book document includes a plurality of extracted texts of the specification book document, wherein each extracted text has a location in the specification book document;
   data received over the network and stored on the server, wherein each datum is associated with a submittal item, wherein the submittal item is a documentation requirement for the construction project; and
   at least one submittal documentation file received over the network and stored on the server, wherein each of the at least one submittal documentation file is associated with the submittal item, wherein the server is configured to:
   associate one extracted text with the submittal item;
   create a first hyperlink from the submittal item to the specification book document at the location of the one extracted text;
   update the specification book document by creating a second hyperlink from the specification book document at the location of the one extracted text to the submittal item;
   upon activation of the second hyperlink by a user, send over the network for viewing by the user at least one datum of the data; and
   upon activation of the first hyperlink by the user, send over the network a passage of the specification book document that includes the one extracted text associated with the submittal item.

2. The documentation system for the construction project of claim 1, wherein at least one extracted text is associated with a section number.

3. The documentation system for the construction project of claim 1, wherein at least one extracted text is at least one of highlighted and annotated at the location of the extracted text in the specification book document.

4. The documentation system for the construction project of claim 1, wherein the data received over the network includes at least one of data describing a submittal request, data describing a submittal package, a submittal item approval status, a revision history for a document, a record of annotations of a document, a responsible party, a material record, a contractor record, and a sub-contractor record.

5. The documentation system for the construction project of claim 1, wherein the server is further configured to receive at least one addendum to the specification book document via the network.

6. The documentation system for the construction project of claim 1, wherein the server is further configured to deploy a text extraction tool to identify the plurality of extracted texts of the specification book document.

7. The documentation system for the construction project of claim 1, wherein at least one submittal documentation file is one of a data sheet, a construction detail drawing, a safety data sheet, a warranty information sheet, a test report, a certification proof, and a meeting agenda.

8. The documentation system for the construction project of claim 1, wherein the data received over the network includes data for a submittal log package related to the submittal item, the data including a section parameter, a sub-section parameter, a textual description, a due date, and a status indicia.

9. The documentation system for the construction project of claim 1, wherein the hyperlink from the submittal item to the extracted text comprises the text "view spec".

10. The documentation system for the construction project of claim 1, wherein the passage of the specification book document includes accompanying requirement text adjacent to the one extracted text.

11. A method for documenting a construction project, comprising:
   receiving, by a server comprising a network interface circuit for communication with a network, a processor connected to the network interface circuit, and a memory connected to the processor and to the network interface circuit, the memory storing data and instructions executed by the processor, a specification book document that is received over the network and stored on the server, wherein the specification book document includes a plurality of extracted texts of the specification book document, wherein each extracted text has a location in the specification book document;
   receiving, by the server, data over the network, wherein each datum is associated with a submittal item, wherein the submittal item is a documentation requirement for the construction project;
   receiving, by the server over the network, at least one submittal documentation file, wherein each of the at least one submittal documentation file is associated with the submittal item;
   associating, by the server, of one extracted text with the submittal item;
   creating, by the server, a first hyperlink from the submittal item to the specification book document at the location of the one extracted text;
   updating, by the server, of the specification book document by creating a second hyperlink from the specification book document at the location of the one extracted text to the submittal item;
   sending, upon activation of the second hyperlink by a user, by the server through the network for viewing by the user, at least one datum of the data; and
   sending, upon activation of the first hyperlink by the user, sending by the server through the network a passage of the specification book document that includes the extracted text associated with the submittal item.

12. The method for documenting the construction project of claim 11, wherein at least one extracted text is associated with a section number.

13. The method for documenting the construction project of claim 11, wherein at least one extracted text is at least one of highlighted and annotated at the location of the extracted text in the specification book document.

14. The method for documenting the construction project of claim 11, wherein the data received over the network includes at least one of data describing a submittal request, data describing a submittal package, a submittal item approval status, a revision history for a document, a record of annotations of a document, a responsible party, a material record, a contractor record, and a sub-contractor record.

15. The method for documenting the construction project of claim 11, further comprising the step of the server receiving at least one addendum to the specification book document via the network.

16. The method for documenting the construction project of claim 11, further comprising the step of the server deploying a text extraction tool to identify the plurality of extracted texts of the specification book document.

17. The method for documenting the construction project of claim 11, wherein at least one submittal documentation file is one of a data sheet, a construction detail drawing, a safety data sheet, a warranty information sheet, a test report, a certification proof, and a meeting agenda.

18. The method for documenting the construction project of claim 11, wherein the data received over the network includes data for a submittal log package related to the submittal item, the data including a section parameter, a sub-section parameter, a textual description, a due date, and a status indicia.

19. The method for documenting the construction project of claim 11, wherein the hyperlink from the submittal item to the extracted text comprises the text "view spec".

20. The method for documenting the construction project of claim 11, wherein the passage of the specification book document includes accompanying requirement text adjacent to the one extracted text.

* * * * *